(12) United States Patent
Yang et al.

(10) Patent No.: US 9,450,647 B2
(45) Date of Patent: Sep. 20, 2016

(54) ANTENNA COUPLER FOR NEAR FIELD WIRELESS DOCKING

(71) Applicants: Songnan Yang, San Jose, CA (US); Bin Xiao, San Ramon, CA (US); Xintian E. Lin, Mountain View, CA (US); Manish A. Hiranandani, Santa Clara, CA (US); Ulun Karacaoglu, San Diego, CA (US)

(72) Inventors: Songnan Yang, San Jose, CA (US); Bin Xiao, San Ramon, CA (US); Xintian E. Lin, Mountain View, CA (US); Manish A. Hiranandani, Santa Clara, CA (US); Ulun Karacaoglu, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/913,550

(22) Filed: Jun. 10, 2013

(65) Prior Publication Data

US 2014/0362837 A1 Dec. 11, 2014

(51) Int. Cl.
| | |
|---|---|
| H04B 5/00 | (2006.01) |
| H01Q 9/04 | (2006.01) |
| H01Q 21/24 | (2006.01) |
| H01Q 21/00 | (2006.01) |
| H01Q 13/20 | (2006.01) |
| H01Q 21/08 | (2006.01) |

(52) U.S. Cl.
CPC .......... *H04B 5/0031* (2013.01); *H01Q 9/045* (2013.01); *H01Q 21/24* (2013.01); *H01Q 13/206* (2013.01); *H01Q 21/0075* (2013.01); *H01Q 21/08* (2013.01)

(58) Field of Classification Search
None
See application file for complete search history.

(56) References Cited

U.S. PATENT DOCUMENTS

| | | | | |
|---|---|---|---|---|
| 5,939,958 A | * | 8/1999 | Grounds, III | H01P 1/20381 333/204 |
| 6,184,833 B1 | * | 2/2001 | Tran | H01Q 1/243 343/700 MS |
| 2002/0113737 A1 | * | 8/2002 | Brachat | H01Q 9/0414 343/700 MS |
| 2004/0157645 A1 | * | 8/2004 | Smith | H01Q 1/246 455/562.1 |
| 2005/0110685 A1 | * | 5/2005 | Frederik du Toit | H01Q 19/005 343/700 MS |
| 2006/0159158 A1 | * | 7/2006 | Moore | G06F 1/1632 375/130 |
| 2007/0194999 A1 | * | 8/2007 | Morton | H01Q 1/48 343/767 |
| 2009/0153405 A1 | * | 6/2009 | Kikuchi | H01Q 9/0442 343/700 MS |
| 2009/0153407 A1 | * | 6/2009 | Zhang | H01Q 1/243 343/702 |
| 2009/0207092 A1 | * | 8/2009 | Nysen | H01Q 1/2275 343/876 |
| 2009/0219213 A1 | * | 9/2009 | Lee | H01P 3/00 343/700 MS |
| 2009/0273418 A1 | * | 11/2009 | Shimizu | H01Q 13/206 333/24 R |
| 2011/0230136 A1 | * | 9/2011 | Washiro | H01P 5/187 455/41.1 |
| 2012/0099566 A1 | * | 4/2012 | Laine et al. | 370/338 |
| 2012/0146869 A1 | * | 6/2012 | Holland | H01P 5/10 343/795 |
| 2013/0044035 A1 | * | 2/2013 | Zhuang | H01Q 9/0428 343/770 |
| 2015/0084826 A1 | * | 3/2015 | Lea | H01Q 9/285 343/853 |

\* cited by examiner

*Primary Examiner* — Chi H Pham
*Assistant Examiner* — Vladislav Agureyev
(74) *Attorney, Agent, or Firm* — Forefront IP Lawgroup, PLLC

(57) ABSTRACT

Described herein are techniques related to one or more systems, apparatuses, methods, etc. for a wireless fidelity (Wi-Fi) based wireless docking station arrangement.

20 Claims, 10 Drawing Sheets

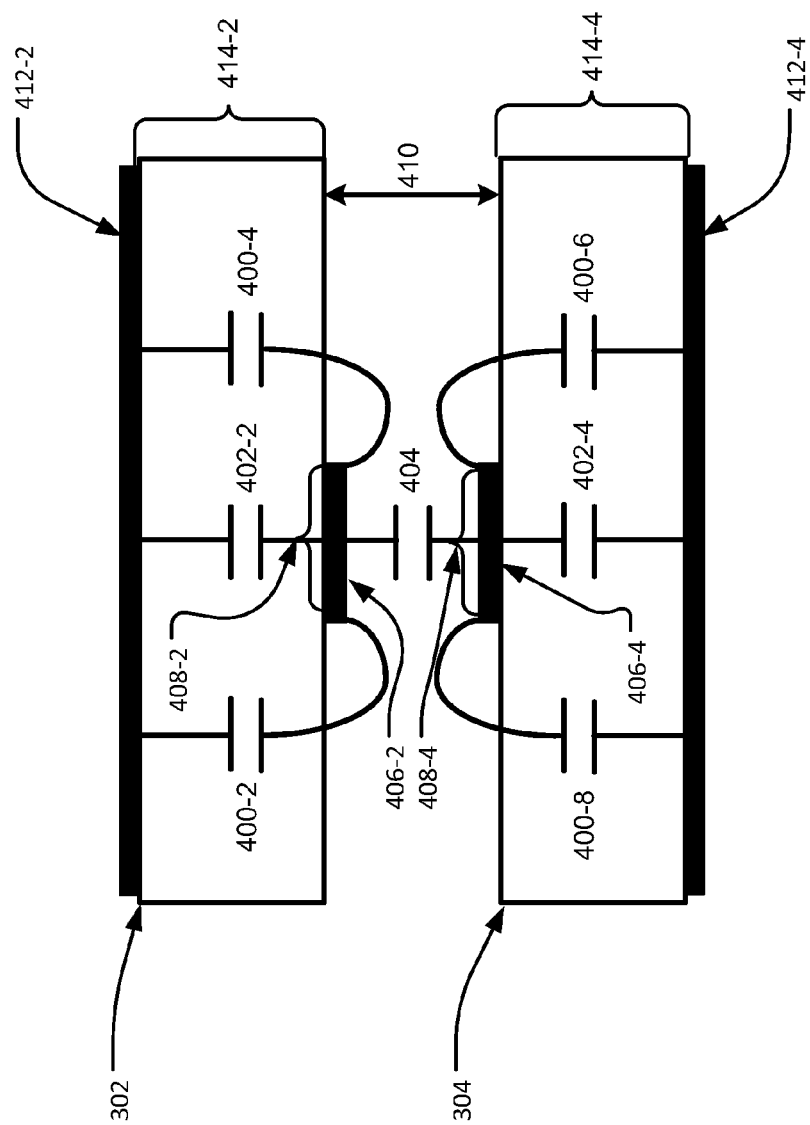

ANTENNA COUPLER FOR NEAR FIELD WIRELESS DOCKING

BACKGROUND

A docking station may provide a simplified way of plugging in peripherals such as a monitor, a keyboard or a mouse to a device, such as a laptop computer. Due to a wide range of devices such as laptop computers, mobile phones, etc. that may be docked with these peripherals, different types of connectors, power signaling, and uses for these devices may require the need to eliminate physical connectors between the device and the peripherals.

For example, wireless docking is a key feature in environments where multiple docking pairs may be located in different areas (e.g., work stations or cubicle) that may be adjacent to one another. For example, a first cubicle may contain a first device and a first docking station to connect multiple peripherals; a second adjacent cubicle may contain a second device and a second docking station to connect with separate peripherals; etc. In this example, a problem may arise when wireless fidelity (Wi-Fi) signals are used to provide high speed wireless data link with the docking pairs. For example, the first docking pair may be able to hear or detect the Wi-Fi signal at the adjacent second docking pair. Therefore "interference" may take place between the docking pairs.

Accordingly, a solution allowing efficient docking operations between docking pairs in the densely deployed environments (e.g., Corporate environment) is desired.

BRIEF DESCRIPTION OF THE DRAWINGS

FIG. 4A illustrates an example structure and electrical characteristics of microstrip lines in accordance with a technology as described herein.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for a wireless fidelity (Wi-Fi) based wireless docking station. Wi-Fi communications or networks may employ various IEEE 802.11 standards, including current and future standards. In an implementation, a device or a wireless device is installed with an antenna coupler (e.g., a conductive line such as a low loss transmission microstrip line) on its base. Similarly, a docking station is installed with similar type of antenna coupler on its docking surface. In this implementation, the antenna coupler of the docking station is perpendicular in direction from the wireless device antenna coupler.

When the wireless device lands on to the docking station, the perpendicular configuration of the antenna couplers (e.g. microstrip lines) facilitates generation of a high coupling capacitance. For example, the microstrip lines contain a substrate size that is designed to be thinner than a wavelength (e.g., at 5 GHz Wi-Fi frequency). In this example, the microstrip lines demonstrate strong near field radiation (e.g., high coupling capacitance) when they are positioned face-to-face with each other. Furthermore, the microstrip lines with such a substrate size demonstrate a decaying far field radiation. This decaying far field radiation may prevent interference between the docking station arrangements. The substrate, for example, may include a dielectric material that is positioned in between microstrip conductor traces and a ground plane.

To support multiple input multiple output (MIMO) communications in the docking station arrangement, an array of two parallel wireless device microstrip lines, for example, are positioned perpendicularly from another array of two parallel docking station microstrip lines. In this example, the two parallel wireless device microstrip lines are fed from the same feeding point location. On the other hand, the two parallel docking station microstrip lines are fed at opposite feeding point locations.

Furthermore, a quadrature hybrid circuit may be added to feeding point locations of the parallel microstrip lines to further improve performance during MIMO operations.

Figure 1:
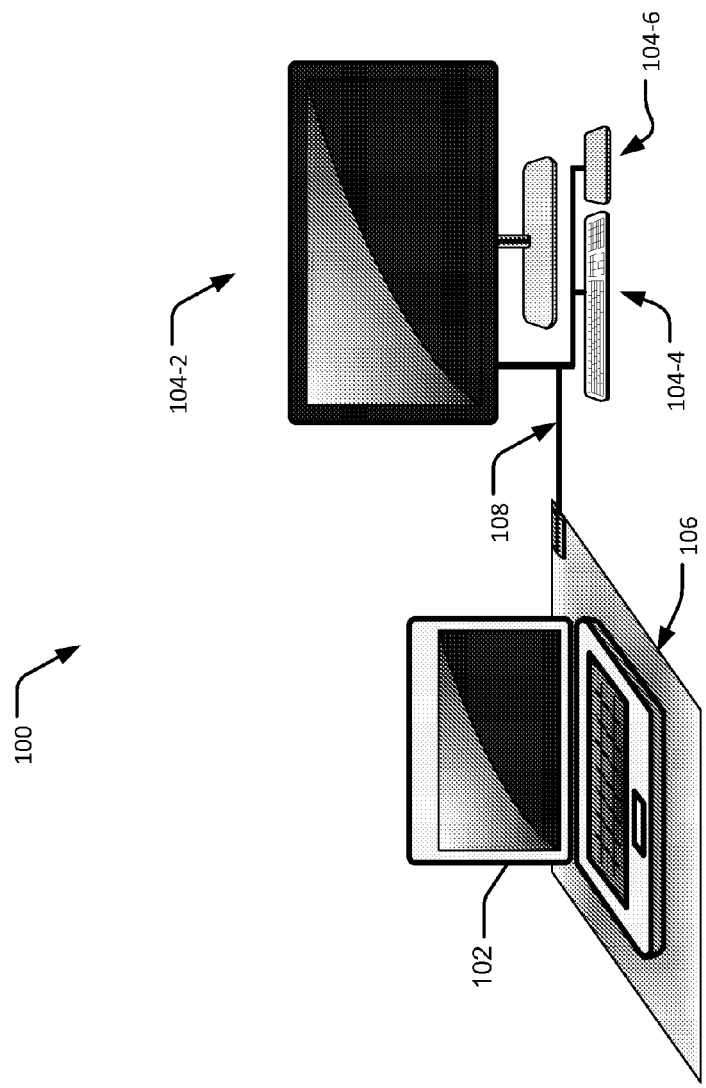
FIG. 1 shows an example scenario for a docking station arrangement.

FIG. 1 illustrates an example docking station arrangement 100 that shows a wireless device connecting with peripheral devices through a docking station. FIG. 1 includes, for example, a wireless device 102, peripheral devices 104, a docking station 106, and a wired link 108. The peripheral devices 104 include, for example, a monitor 104-2, a keyboard 104-4, and a mouse 104-6.

The wireless device 102 utilizes the docking station 106 to establish wireless communications with the peripheral devices 104. For example, the wireless device 102 may use the monitor 104-2 as an extended wireless display (i.e., Wi-Di). In this example, the wireless device 102 is positioned in close proximity (e.g., few millimeters) with the docking station 106 in order to utilize the monitor 104-2. The docking station 106 may be connected to the monitor 104-2 through the wired link 108.

In an implementation, the wireless device 102 includes an antenna coupler (not shown) that is positioned at the bottom or base of the wireless device 102. This antenna coupler is paired, for example, with another antenna coupler (not shown) that is positioned on a top planar surface (i.e., docking surface) of the docking station 106. The top planar surface provides, for example, an area where the base of the wireless device 102 may typically land or be placed during docking operations.

The pairing between the antenna couplers as described herein includes minimal far field radiation. In other words, the antenna couplers are configured to establish local wireless communications between them. For example, FIG. 1 shows the wireless device 102 landing on the docking station 106. In this example, signal power for a particular Wi-Fi channel that is utilized during wireless communications is radiated within few millimeters from the docking station 106.

As an example of present implementations herein, the antenna couplers may include conductive lines such as low loss transmission microstrip lines. Furthermore, the antenna couplers as described herein may be interchanged with microstrip lines or conductive lines.

In an implementation, the wireless device 102 may include, but is not limited to, Ultrabooks™, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

Similarly, the peripheral devices 104 may include, but are not limited to, Input, Output, or Storage peripheral devices 104. The input peripheral device 104 may provide input to the wireless device 102 from a user such as through the keyboard 104-4, mouse 104-6, etc. The output peripheral device 104 may provide output to the user such as, for example, the monitor 104-2 or a printer (not shown). A storage peripheral device 104 may store data (not shown) in between computing sessions such as through a hard drive (not shown) or flash drive (not shown).

Figure 2:
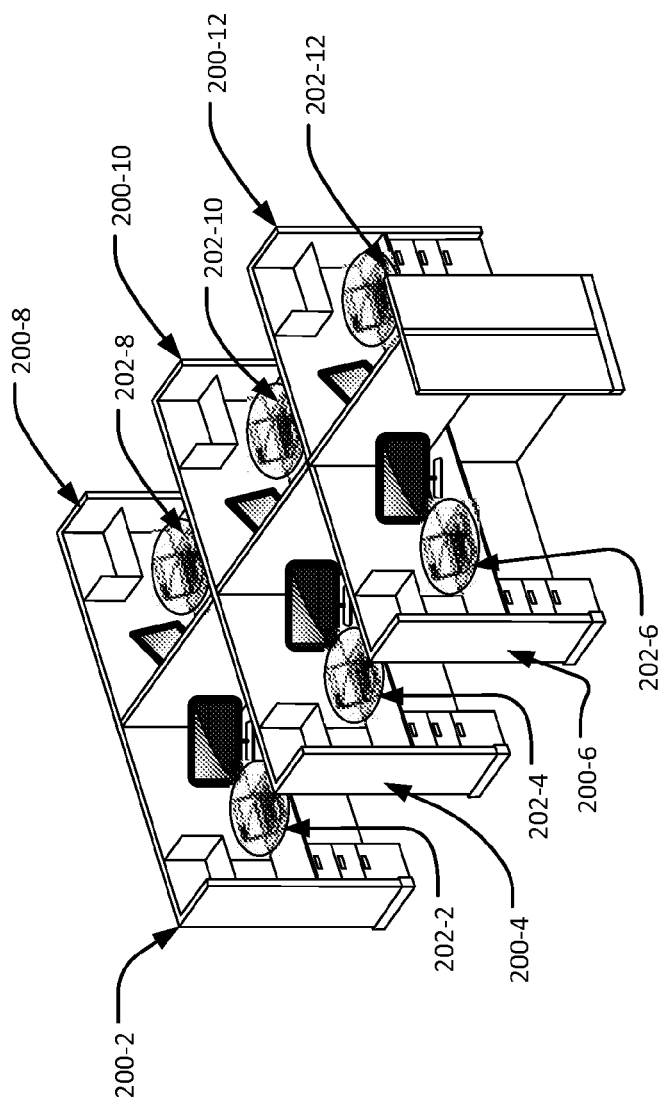
FIG. 2 illustrates docking station arrangements in a densely deployed environment.

FIG. 2 is an example scenario that shows docking station arrangements in a densely deployed environment (e.g., Corporate environment). FIG. 2 illustrates multiple cubicles 200 and multiple docking station arrangements 202.

In an implementation, each cubicle 200-2 to 200-12 contains docking station arrangements 202-2 to 202-12, respectively. In this implementation, the local wireless communications in each of the docking station arrangements 202 does not interfere with another docking station arrangement in an adjacent cubicle 200. For example, the docking station arrangement 202-2 utilizes a particular Wi-Fi channel to provide a high speed data link. In this example, the docking station arrangement 202-2 utilizes a low emitting near field antenna coupler to obtain exclusive use of the particular Wi-Fi channel. In other words, the rest of the docking station arrangements 202-4 to 202-12 may utilize the same Wi-Fi channel without creating interference with one another. This non-interference creates flexibility in the use of the high speed data link (i.e., Wi-Fi channel) in the enterprise environment.

Figure 3:
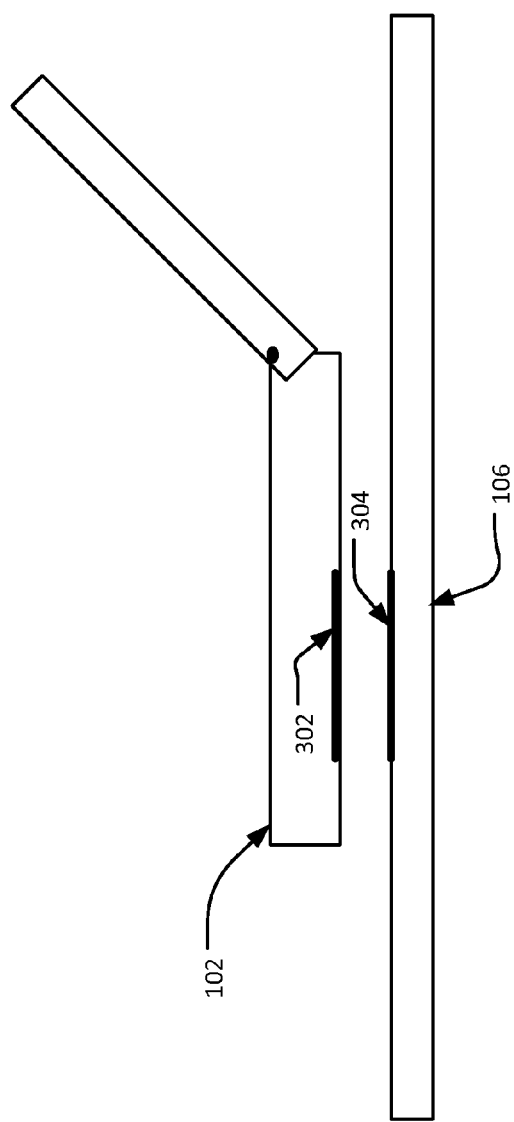
FIG. 3 illustrates an example scenario for a local wireless communication that utilizes antenna couplers.

FIG. 3 illustrates an example scenario 300 for a local wireless communication that utilizes antenna couplers. FIG. 3 includes, for example, the wireless device 102 with a wireless device microstrip line 302 on its base, and the docking station 106 with a docking station microstrip line 304 on its docking surface.

In an implementation, the wireless device 102 docks onto the docking station 106. In this implementation, the wireless device microstrip line 302 is positioned to establish local wireless communications with the docking station microstrip line 304.

For example, the wireless device microstrip line 302 transmits a signal power that facilitates a high Modulation Coding Scheme (e.g., MCS-9). The high Modulation Coding Scheme is implemented for efficient utilization of a particular Wi-Fi channel. In 802.11 ac at 80 MHz bandwidth, for example, the signal power (e.g., Pr) that reaches the docking station microstrip line 304 may be greater than "−55 dBm." With this signal power reaching the docking station microstrip line 304, a maximum throughput is obtained for the particular Wi-Fi channel.

To avoid interference from an adjacent docking station arrangement, the wireless device 102 and the docking station 106 are configured, for example, to attenuate the interfering signal power to less than "−82 dBm." With this attenuation, a triggering of Cooperative Collision Avoidance (CCA) for the local docking pair in FIG. 3 is avoided. For example, the CCA is utilized to lessen interference in wireless environment by shifting to another Wi-Fi channel in case of signal interference to original Wi-Fi channel.

With continuing reference to FIG. 3, the wireless device microstrip lines 302 and the docking station microstrip lines 304 are further configured to support the following requirements. For example, a strong near field radiation or coupling is obtained while minimal far field radiation/leakage is generated. In this example, the wireless device microstrip lines 302 and the docking station microstrip lines 304 support x-y positional flexibility of the docking station arrangement. Furthermore, the configurations support MIMO communications in between the wireless device 102 and the docking station 106.

FIG. 4A shows an example structure and electrical characteristics of the microstrip lines in accordance with the technology as described herein. FIG. 4A shows the wireless device microstrip line 302 that is in face-to-face position with the docking station microstrip line 304. In other words, the wireless device microstrip line 302 is directly positioned within near field radiation of the docking station microstrip line 304. Furthermore, FIG. 4A includes fringing capacitances 400, parallel plate capacitances 402, a coupling capacitance 404, microstrip conductors 406, microstrip conductor widths 408, a coupling distance 410, ground planes 412, and substrate thickness 414.

As an example of present implementations herein, microstrip lines (e.g., wireless device microstrip line 302) are low loss transmission lines that are commonly used, for example, in microwave circuits. The wireless device microstrip line 302, for example, includes a dielectric material—the thickness of which is defined by the substrate thickness 414-2. The dielectric material is located in between the microstrip conductor 406-2 and the ground plane 412-2.

When the size of the substrate thickness 414-2 is less than (i.e., thinner) as compared to a wavelength (e.g., frequency of a signal current in the microstrip conductor 406) and the device microstrip line 302 is terminated by a matched load, the signal current that flows in the microstrip conductor 406-2 and the signal current that returns through the ground plane 412-2 (i.e., return path) appear to be very close to each other. As a result, the wireless device microstrip line 302 will generate a smaller far field radiation. This is because fringing fields will have an exponential decay over distance.

However, with regard to its near field radiation, the same structure may support a strong near field coupling. For example, when the microstrip conductor 406-2 and the microstrip conductor 406-4 are brought closer to each other during the docking operation, the coupling capacitance 404 will generate a higher value. In this example, the coupling capacitance 404 increases when the coupling distance 410 decreases. The coupling capacitance 404 further increases when a higher overlapping area between the microstrip conductors 406 is obtained. For example, a higher overlapping area between the microstrip conductor widths 408 increases the coupling capacitance 404.

With continuing reference to FIG. 4A, the parallel plate capacitances 402 may include equivalent capacitances for parasitic capacitances in the microstrip lines. The parallel plate capacitances 402 co-exist with the fringing capacitances 400 when signal currents are flowing through the microstrip lines. For example, the fringing capacitances 400-2 and 400-4 represent electrical characteristics of the device microstrip line 302 due to energizing signal currents.

Figure 4B:
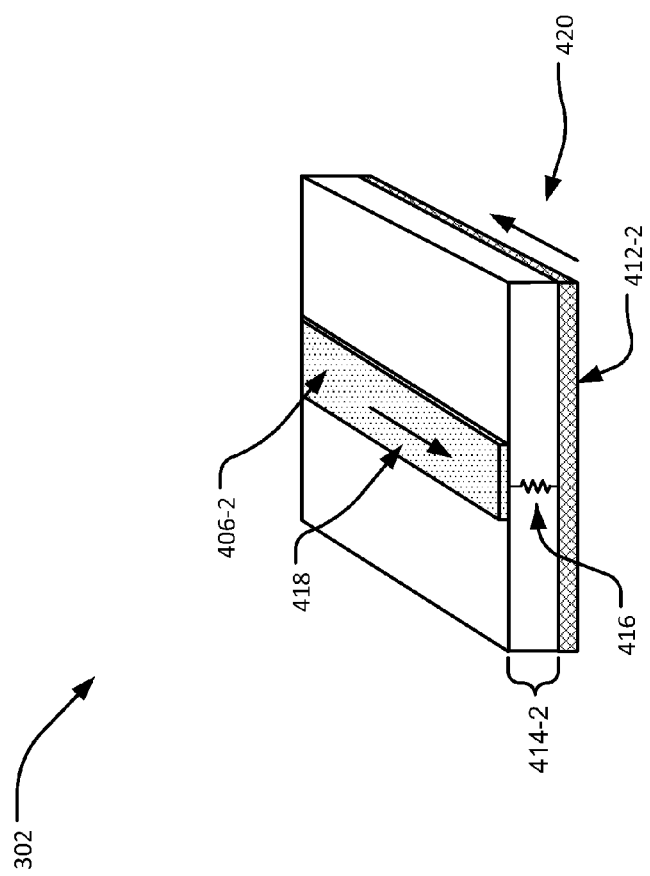
FIG. 4B illustrates an example antenna coupler with a matching load termination.

FIG. 4B illustrates an example antenna coupler with a matching load termination. As shown, FIG. 4B shows the wireless device microstrip line 302 with a matching load termination 416, a signal current direction 418, and a return current direction 420.

In an implementation, the matching load termination 416 is designed maximize power transfer or to minimize reflections in the microstrip conductor 406-2. For example, when the matching load termination 416 is equal to characteristic impedance of the microstrip conductor 406-2, a minimum leakage is obtained. With this minimum leakage, the wireless device microstrip line 302 will generate low radiation. In other words, the fringing electric fields of the wireless device microstrip line 302 will provide a uniform and strong capacitive coupling in near field radiation.

FIG. 4B further illustrates the direction of the signal current (i.e., signal current direction 418) to be opposite in direction with the return current (i.e., return current direction 420). With the matching load termination 416, the signal and return currents appear to be very close to each other. In other words, the wireless device microstrip line 302 will generate a low far field radiation while the emitted near field radiation will be stronger.

Figure 5:
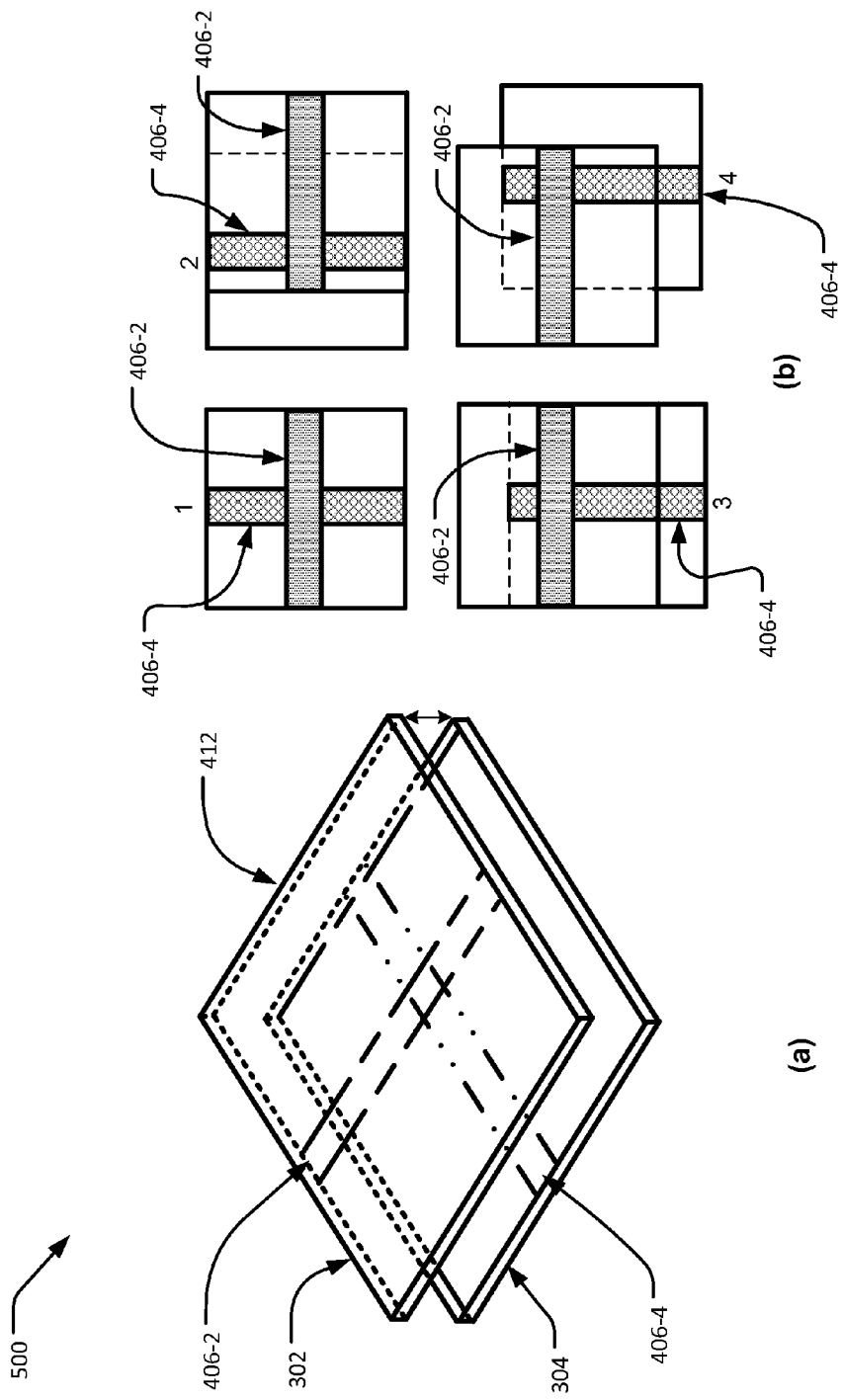
FIG. 5 illustrates an example antenna coupler configuration that supports x-y positional flexibility in a docking station.

FIG. 5 shows an example antenna coupler configuration 500 that supports x-y positional flexibility of the docking station arrangement. FIG. 5a includes the microstrip conductor 406-2 of the wireless device microstrip line 302 that is positioned perpendicularly to the microstrip conductor 406-4 of the docking station microstrip line 304. In other words, the microstrip conductors 406 are positioned in between the ground planes 412 for this face-to-face configuration.

The docking station arrangement in accordance with the technology described herein may provide the x-y positional flexibility. That is, by maintaining higher connection quality during the local wireless communications. For example, the x-y positional flexibility may include the ability of the wireless device 102 to maintain the same quality connection if the wireless device 102 is moved along horizontal or vertical direction in the docking surface. In this example, the overlapping area between the microstrip conductors 406 are maintained to generate the high quality connection.

With continuing reference to FIG. 5, the microstrip conductor 406-2 is positioned, for example, in a horizontal configuration. With this configuration, the microstrip conductor 406-4 is positioned perpendicularly from the horizontal configuration of the microstrip conductor 406-2. Similarly, this example configuration may be interchanged without affecting the amount of overlapping area in between the microstrip conductors 406. In other words, the same amount of coupling capacitances are generated by the differing x and y direction offset conditions.

For example, FIGS. 5b(1) to 5b(4) illustrate a constant amount of coupling capacitances between the microstrip conductors 406. In this example, offsetting the two couplers in x and y directions may not affect the overlapping area of traces for the microstrip conductors 406. To this end, there is no change in the coupling capacitances and path loss.

Furthermore, a matching load (not shown) may be utilized to terminate the microstrip conductors 406. For example, the matching load is utilized to maintain field distribution along the length of microstrip conductor 406. In this example, the matching load eliminates standing wave patterns that generate losses to these transmission lines (i.e., microstrip lines).

Figure 6:
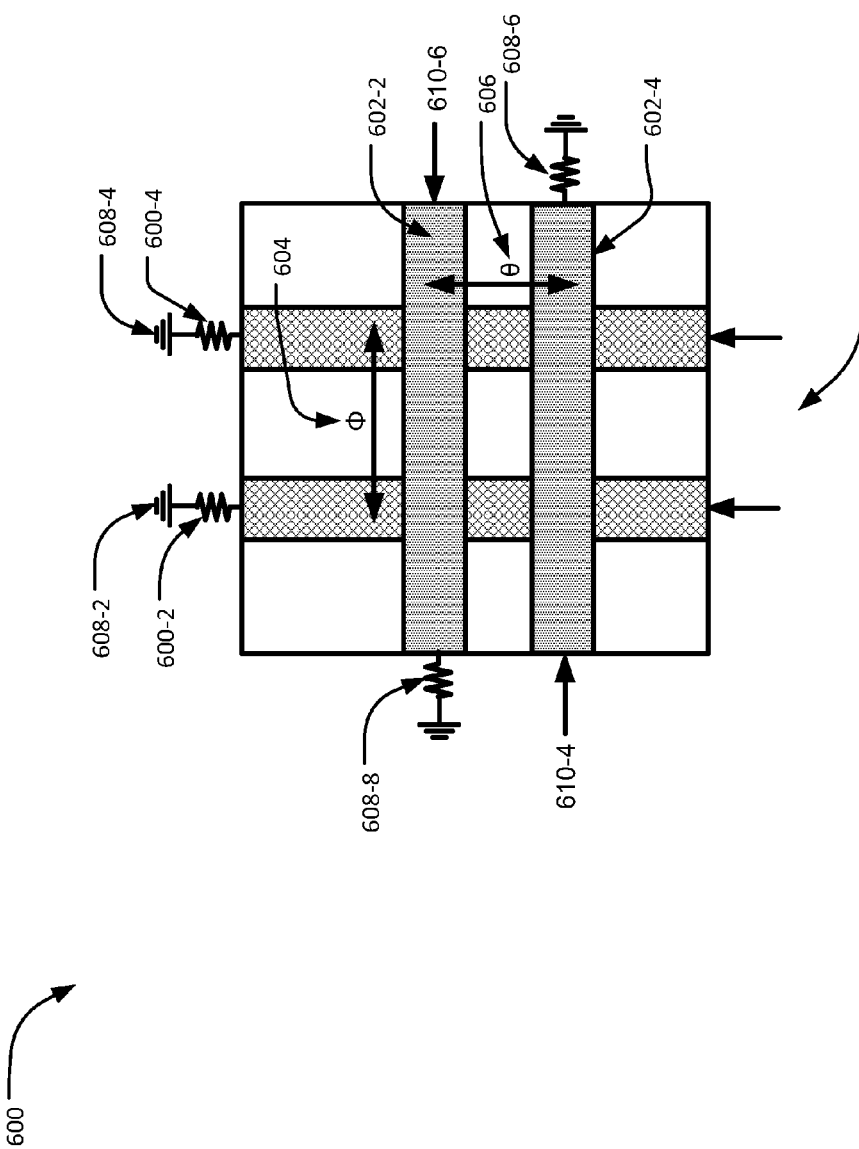
FIG. 6 illustrates an example antenna coupler configuration that supports multiple input multiple output (MIMO) communication channel in a docking station.

FIG. 6 shows an example antenna coupler configuration that supports MIMO communication channel in a docking station arrangement. FIG. 6 includes transmitting microstrip lines 600, receiving microstrip lines 602, transmitting microstrip lines spacing 604, receiving microstrip line spacing 606, matching loads 608, and feeding point locations 610.

In an implementation, the transmitting microstrip lines 600-2 and 600-4 are an array of parallel microstrip lines. That is, they are positioned in one direction. In this implementation, the receiving microstrip lines 602 are also positioned in parallel with one another; however, they are positioned perpendicularly with the transmitting microstrip lines 600. Although FIG. 6 shows this transmitting-receiving configuration, in reality, the transmitting microstrip lines can be the receiving microstrip lines, and vice versa.

In order for the MIMO configuration to obtain higher diversity, i.e., a higher determinant value of channel matrix (H), the transmitting microstrip lines 600 are fed in the same feeding point location 610-2. However, the receiving microstrip lines 602 are fed in opposite direction or at the feeding point locations 610-4 and 610-6. For example, the transmitting microstrip lines 600 are energized by a signal power from the feeding point location 610-2 towards the matching loads 608-2 and 608-4. In this example, the receiving microstrip lines 602 are fed in opposite directions (i.e., at feeding point locations 610-4 and 610-6, respectively) to obtain a higher diversity between the MIMO channels (i.e., higher determinant value of the Channel matrix (H)).

For a particular transmitting microstrip lines spacing 604 and receiving microstrip line spacing 606, the opposite directions of signal power in the receiving microstrip lines 602 and the unilateral direction of the signal power in the transmitting microstrip lines 600 may generate higher determinant value of the H. In this example, the determinant value of the H may reach its maximum value at an odd integer multiple of ninety degrees in electrical length.

To illustrate a derivation of this maximum determinant value of the H, assume that electrical length of the transmitting microstrip lines spacing 604 and receiving microstrip line spacing 606 are represented by $\phi$ and $\theta$, respectively. Furthermore, assume that the coupling between each pair of transmitting microstrip line 600 and receiving microstrip line 602 is "$\alpha$". Then a channel matrix H may be written as:

$$H = \begin{bmatrix} \alpha e^{-j(\theta+\varphi)} & \alpha \\ \alpha e^{-j\theta} & \alpha e^{-j\varphi} \end{bmatrix}$$

and the determinant of this channel is:

$$\det(H) = \begin{vmatrix} \alpha e^{-j(\theta+\varphi)} & \alpha \\ \alpha e^{-j\theta} & \alpha e^{-j\varphi} \end{vmatrix} = \alpha^2 |e^{-j2\varphi} - 1|.$$

With this channel matrix, the determinant value of H may reach its maximum value of $2\alpha^2$ when $e^{-2j\alpha}=-1$. In other words, H may reach its maximum determinant value at an odd integer multiple of ninety degrees since the value of $\alpha$ is equal to "$(2n-1)\pi/2$."

Figure 7:
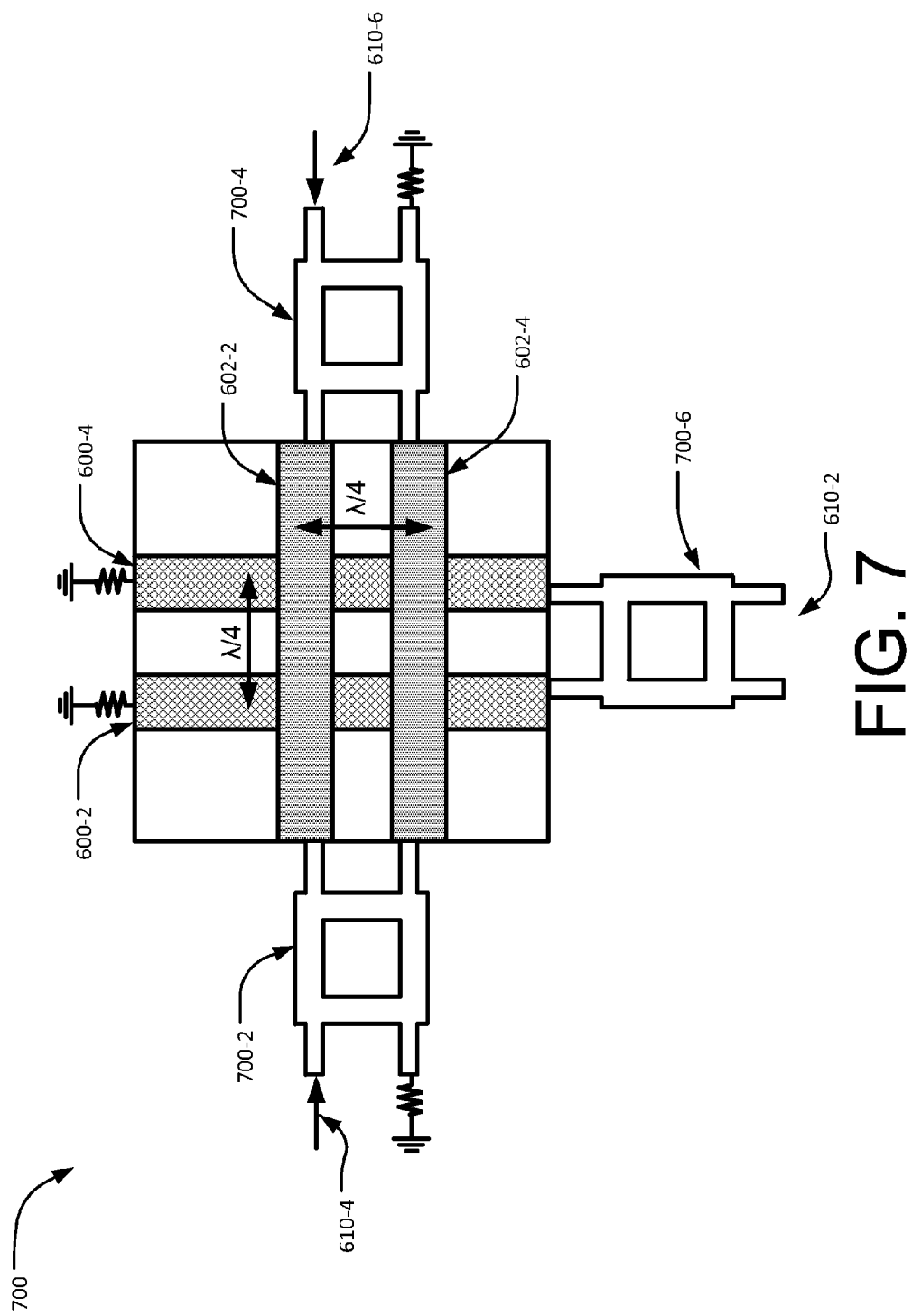
FIG. 7 illustrates an example antenna coupler configuration that supports multiple input multiple output (MIMO) communication channel in a docking station.

FIG. 7 illustrates an example antenna coupler configuration that supports MIMO communication channel in a docking station arrangement. FIG. 7 includes the same structure as shown in FIG. 6 although additional power dividers 700 are placed at the feeding point locations 610 of the transmitting/receiving microstrip lines.

In an implementation, a quadrature hybrid circuit equal power divider (i.e., power dividers 700) may be added to the antenna coupler configuration as shown in FIG. 7. For example, the quadrature hybrid circuit is a ninety degree equal power divider that contains a characteristic impedance of $Zo/(2)^{1/2}$ (i.e., Zo divided by "square root of two"). This characteristic impedance is placed, for example, at the feeding point locations 610 (i.e., signal power input side) of the microstrip lines to divide the input voltage (i.e., input power). For example, with this quadrature hybrid circuit, the input voltage at the transmitting microstrip lines 600-2 and 600-4 will now be equal to the voltage divided by the square root of two (i.e., $V/2^{1/2}$). In this example, the amount of voltage facilitates the equal division of the input power at the feeding point location 610-2. Furthermore, the characteristic impedance Zo may be equal in value with the matching loads 408 in order for all of the signal power to be absorbed.

In other implementations, other types of ninety degree equal power divider (quadrature hybrid) may be utilized to establish higher signal to interference ratio by feeding from input point locations 610 of the quadrature hybrid. For example, a transfer function of the feeding point locations 610 for the transmitting/receiving microstrip lines includes identical matrix. In this example, the MIMO communications in the transmitting/receiving microstrip lines will have a maximum isolation. In other words, between feed points 610-2 at the transmitting side and the feed points 610-4 and 610-6 at the receiving side, two complete independent channels can be constructed.

Figure 8:
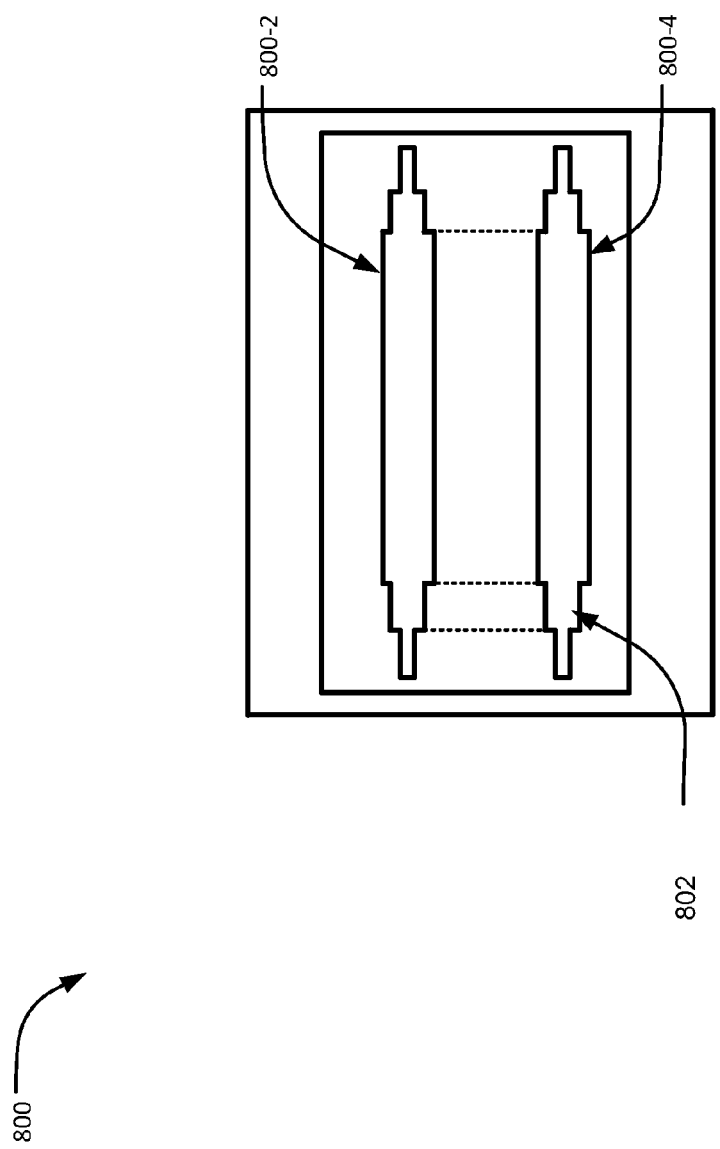
FIG. 8 illustrates an example antenna coupler configuration to vary amount of coupling during wireless communications.

FIG. 8 shows an example implementation to improve coupling in accordance with the technology as described herein. FIG. 8 shows an antenna coupler that includes a quarter wavelength impedance transformers 802 and widened microstrip conductors 800.

In an implementation, the coupling coefficient (e.g., coupling coefficient 404) may be adjusted by increasing/decreasing the microstrip conductor width (e.g., microstrip conductor width 408) of the microstrip lines. For example, the widened microstrip conductors 800 may be widened to increase the overlapping area between the transmitting/receiving microstrip lines. In this example, the coupling coefficient 404 is correspondingly increased as well.

In another implementation, an impedance transformation circuit (not shown) may be used to locally widen this overlapping area without physically adjusting the widened microstrip conductor 800. This widening has a similar effect of generating an increased coupling coefficient.

In the latter implementation, the quarter wavelength impedance transformers 802 may be utilized at either ends of the low impedance section (i.e., section not covered by the widened microstrip conductors 800) to match these ends of the microstrip lines with the higher impedance in the widened microstrip conductors 800. For example, this matching configuration maintains a constant field distribution in the middle section (i.e., widened microstrip conductors 800). In addition, higher coupling coefficient is obtained due to the increase in the overlapping area in the microstrip lines.

Figure 9:
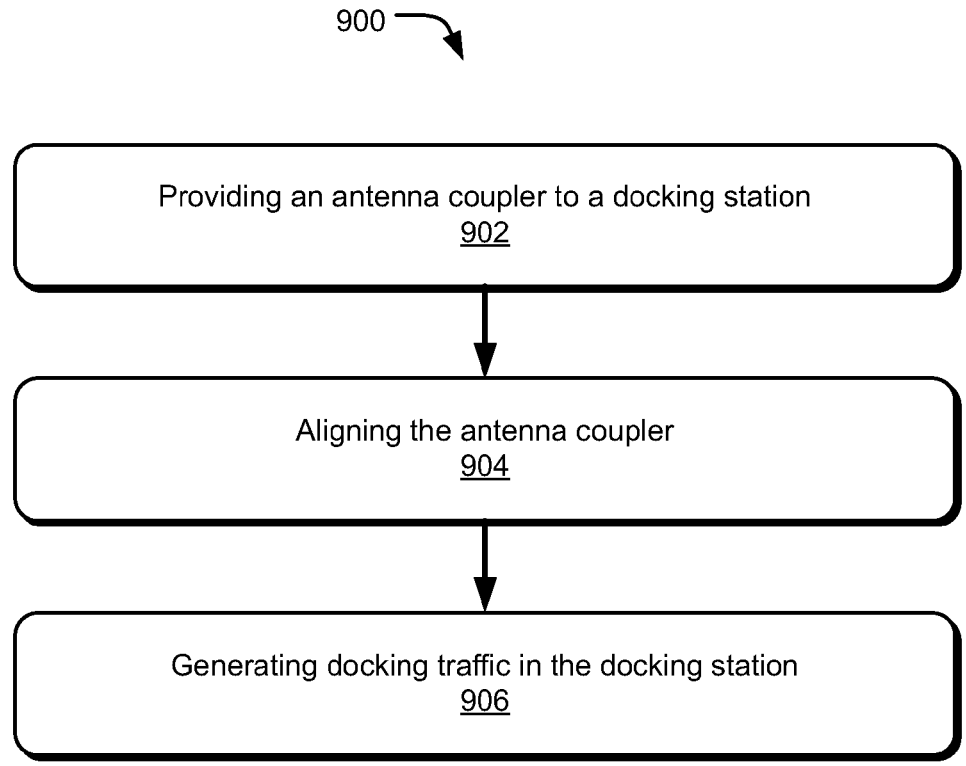
FIG. 9 illustrates an example process chart showing an example method for facilitating a wireless fidelity (Wi-Fi) based docking station.

Furthermore, the antenna coupler configuration FIG. 8 may be utilized for wireless power charging of the wireless device 102. This wireless power charging may operate simultaneously with the local wireless communications to offer complete docking experience FIG. 9 shows an example process chart 900 illustrating an example method for facilitating Wi-Fi based docking station. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 902, providing an antenna coupler to a docking station is performed. For example, the antenna coupler is a microstrip line (e.g., docking station microstrip line 304) that is constructed to include a substrate that is lesser in size (i.e., thinner) than a wavelength. The wavelength may be defined by a frequency of a particular Wi-Fi channel that is utilized for local wireless communications (e.g., 5 GHz Wi-Fi channel frequency).

At block 904, aligning the antenna coupler of the docking station to facilitate overlapping with another antenna coupler during a wireless communication is performed. For example, the docking station microstrip line 304 is configured to act as a receiving microstrip line. In this example, the docking station microstrip line 304 is aligned in a perpendicular configuration with another antenna coupler that is configured to act as transmitting microstrip line (e.g., wireless device microstrip line 302). This perpendicular configuration provides an overlapping area to generate a coupling coefficient.

At block 906, generating a docking traffic in the docking station is performed. In an implementation, the docking traffic (e.g., data transmission/reception) may be generated through the local wireless communication between the wireless device 102 and the docking station 106.

The following examples pertain to further embodiments:

Example 1 is a docking station comprising: a docking surface; an antenna coupler placed on to the docking surface, wherein the antenna coupler is configured to wirelessly communicate with an antenna coupler of a device, wherein the antenna coupler is configured to overlap and is substantially perpendicular to the antenna coupler of the device during wireless communication between the docking station and device.

In Example 2, the docking station of Example 1, where the antenna coupler may include a microstrip line that is thinner in size than a wavelength, where the wavelength is defined by an operating frequency that is utilized in the wireless communication.

Example 3, the docking station of Example 1, where the antenna coupler may include a dielectric material that is positioned between a microstrip conductor and a ground plane.

In Example 4, the docking station of Examples 1, 2 or 3 wherein the antenna coupler may include an array of parallel microstrip lines that are input at the same location to facilitate transmission in a multiple input multiple output (MIMO) communication.

In Example 5, the docking station of Examples 1, 2 or 3 wherein the antenna coupler may include an array of parallel microstrip lines that are input at the same location, wherein an electrical distance between the parallel microstrip lines is kept at an odd integer multiple of ninety degrees.

In Example 6, the docking station of Examples 1, 2 or 3 wherein the antenna coupler may include an array of parallel microstrip lines that are fed at opposite feeding point locations to facilitate receiving of signals in a multiple input multiple output (MIMO) communication.

In Example 7, the docking station of Examples 1, 2 or 3 wherein the antenna coupler may include an array of parallel microstrip lines, the parallel microstrip lines include a feeding point location that utilizes a ninety degree equal power divider to facilitate a multiple input multiple output (MIMO) communication.

In Example 8, the docking station of Examples 1, 2 or 3 wherein the antenna coupler may further include a low impedance transformer that is configured to match a high impedance section of the antenna coupler.

Example 9 is a docking station includes means to accept a device a docking surface; means to wirelessly communicate with an antenna coupler of a device, wherein the means to wirelessly communicate is configured to overlap and is substantially perpendicular to the antenna coupler of the device during wireless communication between the docking station and device.

In Example 10, the docking station of Example 9 may have the means to wirelessly communicate include a microstrip line that is thinner in size than a wavelength, wherein the wavelength is defined by an operating frequency that is utilized in the wireless communication.

In Example 11, the docking station of Example 9 may have the means to wirelessly communicate include a dielectric material that is positioned between a microstrip conductor and a ground plane.

In Example 12, the docking station of Examples 9, 10 and 11 may have the means to wirelessly communicate include an array of parallel microstrip lines that are input at the same location to facilitate transmission in a multiple input multiple output (MIMO) communication.

In Example 13, the docking station of Examples 9, 10 and 11 may have the means to wirelessly communicate include an array of parallel microstrip lines that are input at the same location, wherein an electrical distance between the parallel microstrip lines is kept at an odd integer multiple of ninety degrees.

In Example 14, the docking station of Examples 9, 10 and 11 may have the means to wirelessly communicate include an array of parallel microstrip lines that are fed at opposite feeding point locations to facilitate receiving of signals in a multiple input multiple output (MIMO) communication.

In Example 15, the docking station of Examples 9, 10 and 11 may have the means to wirelessly communicate include an array of parallel microstrip lines, the parallel microstrip lines include a feeding point location that utilizes a ninety degree equal power divider to facilitate a multiple input multiple output (MIMO) communication.

In Example 16, the docking station of Examples 9, 10 and 11 may further include means to match a high impedance section of the means to wirelessly communicate.

Example 17 is an antenna coupler that includes a microstrip conductor that conducts a signal current; a ground plane that is configured as a return path for the signal current; a dielectric material that is positioned in between the ground plane and the microstrip conductor, the dielectric material includes a thickness size that is lesser than a wavelength, the wavelength is defined by a frequency of the signal current.

In Example 18, the coupler of Example 17, may have the microstrip conductor include a width that is adjusted to increase or decrease a coupling coefficient when the microstrip conductor is positioned on top of another microstrip conductor during a wireless communication.

In Example 19, the coupler of Example 17, may have the microstrip conductor include the signal current in the microstrip conductor and the returning signal current through the ground plane are substantially close to each other.

In Example 20, the antenna coupler of Examples 17, 18 or 19, may have an array of parallel microstrip conductors that are fed at the same input point location to facilitate transmission of the signal current in a multiple input multiple output (MIMO) communication.

In Example 21, the antenna coupler of Examples 17, 18 or 19, may have an array of parallel microstrip conductors that are fed at opposite feeding point locations to facilitate receiving of the signal current in a multiple input multiple output (MIMO) communication.

In Example 22, the antenna coupler of Examples 17, 18 or 19, may further include a matching load to terminate the microstrip conductor.

In Example 23, the antenna coupler of Examples 17, 18 or 19, may further include a ninety degree equal power divider that is positioned in a feeding point location of an array of parallel microstrip conductors.

In Example 24, the antenna coupler of Examples 17, 18 or 19, may further include a quarter wavelength impedance transformer that is positioned at both ends of the microstrip conductor to match a high impedance middle section in the microstrip conductor, wherein the high impedance middle section is utilized to increase a coupling coefficient during a wireless communication.

Example 25 is an antenna coupler that includes means for conducting a signal current; means for providing a return path for the signal current; means for insulating between the means for providing the return path and the means for conducting a signal current, the means for insulating includes a thickness size that is lesser than a wavelength, the wavelength is defined by a frequency of the signal current.

In Example 26, the antenna coupler of Example 25 may include means for conducting a signal current includes a width that is adjusted to increase or decrease a coupling coefficient when the means for conducting a signal current is positioned on top of another means for conducting a signal current during a wireless communication.

In Example 27, the antenna coupler of Example 25 where the signal current in the means for conducting a signal current and a returning signal current through means for providing a return path are substantially close to each other.

In Example 28, the antenna coupler of Examples 25, 26 or 27, where an array of parallel microstrip conductors may be fed at the same input point location to facilitate transmission of the signal current in a multiple input multiple output (MIMO) communication.

In Example 29, the antenna coupler of Examples 25, 26 or 27 may include an array of parallel microstrip conductors are fed at opposite feeding point locations to facilitate receiving of the signal current in a multiple input multiple output (MIMO) communication.

In Example 30, the antenna coupler of Examples 25, 26 or 27 may include a means for matching load to terminate the means for conducting a signal current.

In Example 31, the antenna coupler of Examples 25, 26 or 27 may include a means for providing ninety degree equal power dividing that is positioned in a feeding point location of an array of parallel means for conducting signal current.

In Example 32, the antenna coupler of Examples 25, 26 or 27 may include a means to provide quarter wavelength impedance transformation that is positioned at both ends of the means for conducting signal current to match a high impedance middle section in the means for conducting signal current, wherein the high impedance middle section is utilized to increase a coupling coefficient during a wireless communication.

Example 33 is a method of facilitating a wireless fidelity (Wi-Fi) based docking station, the method includes: providing an antenna coupler to a docking station; aligning the antenna coupler of the docking station to facilitate overlapping with another antenna coupler during a wireless communication, wherein the antenna coupler is configured to be substantially perpendicular from the other antenna coupler; and generating docking traffic in the docking station.

In Example 34 the method of Example 33, the antenna coupler may include a microstrip conductor width that is adjusted to increase or decrease a coupling coefficient when the antenna coupler is positioned on top of the other antenna coupler during the wireless communication.

In Example 35 the method of Example 33, the antenna coupler may include an array of parallel microstrip lines that are fed at the same feeding point location to facilitate transmission of a signal current in a multiple input multiple output (MIMO) communication.

In Example 36 the method of Examples 33, 34 and 35, where the antenna coupler may include an array of parallel microstrip lines that are fed at opposite feeding point locations to support a multiple input multiple output (MIMO) communication.

What is claimed is:

1. A docking station comprising:
   a docking surface;
   a first antenna coupler placed on to the docking surface, wherein the antenna coupler overlaps with a second antenna coupler of another device during a wireless communication, said first antenna coupler placed on the docking surface comprises parallel microstrip lines that are perpendicular with said second antenna coupler of another device when said antenna couplers are offset with each other in a horizontal or a vertical (x-y) direction, wherein an electrical distance between the parallel microstrip lines is kept at an odd integer multiple of ninety degrees and the parallel microstrip lines are fed at opposite feeding locations.

2. The docking station as recited in claim 1, wherein the microstrip lines are thinner in size than a wavelength, wherein the wavelength is defined by an operating frequency that is utilized in the wireless communication.

3. The docking station as recited in claim 1, wherein the first antenna coupler includes a dielectric material that is positioned between a microstrip conductor and a ground plane.

4. The docking station as recited in claim 1, wherein the second antenna coupler of the other device includes an array of parallel microstrip lines that are fed at the same location to facilitate transmission in a multiple input multiple output (MIMO) communication.

5. The docking station as recited in claim 1, wherein the first antenna coupler includes a maximum determinant value (H).

6. The docking station as recited in claim 5, wherein the first antenna coupler includes an array of parallel microstrip lines that are fed at opposite feeding point locations to facilitate receiving of signals using the maximum determinant value (H).

7. The docking station as recited in claim 1, wherein the first antenna coupler includes an array of parallel microstrip lines, the parallel microstrip lines include a feeding point location that utilizes a ninety degree equal power divider to facilitate a multiple input multiple output (MIMO) communication.

8. The docking station as recited in claim 1, further comprising a low impedance transformer that is configured to match a high impedance section of the first antenna coupler.

9. An antenna coupler comprising:
   parallel microstrip conductors that conduct a signal current;
   a ground plane that is configured as a return path for the signal current;
   a dielectric material that is positioned in between the ground plane and the parallel microstrip conductors, the dielectric material includes a thickness size that is lesser than a wavelength, the wavelength is defined by a frequency of the signal current, wherein an electrical distance between the parallel microstrip conductors is kept at an odd integer multiple of ninety degrees and the parallel microstrip lines are fed at opposite feeding locations.

10. The antenna coupler as recited in claim 9, wherein the microstrip conductor includes a width that is adjusted to increase or decrease a coupling coefficient when the microstrip conductor is positioned on top of another microstrip conductor during a wireless communication.

11. The antenna coupler as recited in claim 9, wherein the signal current in the microstrip conductor and the returning signal current through the ground plane are substantially close to each other.

12. The antenna coupler as recited in claim 9, wherein an array of parallel microstrip conductors are fed at the same input point location to facilitate transmission of the signal current in a multiple input multiple output (MIMO) communication.

13. The antenna coupler as recited in claim 9, wherein an array of parallel microstrip conductors are fed at the opposite feeding point locations to facilitate receiving of the signal current in a multiple input multiple output (MIMO) communication.

14. The antenna coupler as recited in claim 9 further comprising a matching load to terminate the microstrip conductor.

15. The antenna coupler as recited in claim 9 further comprising a ninety degree equal power divider that is positioned in a feeding point location of an array of parallel microstrip conductors.

16. The antenna coupler as recited in claim 9 further comprising a quarter wavelength impedance transformer that is positioned at both ends of the microstrip conductor to match a high impedance middle section in the microstrip conductor, wherein the high impedance middle section is utilized to increase a coupling coefficient during a wireless communication.

17. A method of facilitating a wireless fidelity (Wi-Fi) based docking station, the method comprising:
   providing a first antenna coupler to a docking station, wherein the first antenna coupler comprises parallel microstrip lines;
   aligning said first antenna coupler of the docking station to facilitate overlapping with a second antenna coupler during a wireless communication, wherein the first antenna coupler of the docking station is configured to be perpendicular with the second antenna coupler when both said antenna couplers are offset with each other in a horizontal or a vertical direction, wherein an electrical distance between the parallel microstrip lines of the docking station is kept at an odd integer multiple of ninety degrees and the parallel microstrip lines are fed at opposite feeding locations; and generating docking traffic in the docking station.

18. The method as recited in claim 17, wherein the first antenna coupler includes a microstrip conductor width that is adjusted to increase or decrease a coupling coefficient when the first antenna coupler is positioned on top of the second antenna coupler during the wireless communication.

19. The method as recited in claim 17, wherein the first antenna coupler includes an array of parallel microstrip lines that are fed at the same feeding point location to facilitate transmission of a signal current in a multiple input multiple output (MIMO) communication.

20. The method as recited in claim 17, wherein the first antenna coupler includes an array of parallel microstrip lines that are fed at the opposite feeding point locations to support receiving of signals in a multiple input multiple output (MIMO) communication.

* * * * *